United States Patent
Uang

(10) Patent No.: US 9,260,582 B2
(45) Date of Patent: Feb. 16, 2016

(54) METHOD OF PRODUCING POLY(VINYL BUTYRAL) LAMINATE FROM DISCARDED LAMINATED GLASS

(71) Applicants: Shu-Hue Shao, Taichung (TW); Li-Yun Chen, Zhongshan, Guangdong Province (CN)

(72) Inventor: Yuh-Jye Uang, Taichung (TW)

(73) Assignees: Shu-Hue Shao, Taichung (TW); Li-Yun Chen, Zhongshan, Guangdong Province (CN)

( * ) Notice: Subject to any disclaimer, the term of this patent is extended or adjusted under 35 U.S.C. 154(b) by 190 days.

(21) Appl. No.: 14/217,777

(22) Filed: Mar. 18, 2014

(65) Prior Publication Data
US 2015/0266283 A1    Sep. 24, 2015

(51) Int. Cl.
| | |
|---|---|
| *B29B 17/02* | (2006.01) |
| *B29B 17/04* | (2006.01) |
| *B32B 27/12* | (2006.01) |
| *B32B 27/30* | (2006.01) |
| *C08J 11/06* | (2006.01) |
| *B29K 29/00* | (2006.01) |

(52) U.S. Cl.
CPC ............... *C08J 11/06* (2013.01); *B29B 17/02* (2013.01); *B32B 27/12* (2013.01); *B32B 27/30* (2013.01); *B29B 2017/0217* (2013.01); *B29B 2017/0289* (2013.01); *B29B 2017/0484* (2013.01); *B29K 2029/14* (2013.01); *C08J 2331/02* (2013.01); *Y02W 30/521* (2015.05); *Y02W 30/622* (2015.05)

(58) Field of Classification Search
CPC .......... C08J 11/06; B29B 13/10; B29B 17/02; B29B 17/04; B29B 17/0412; B29B 2017/0217; B29B 2017/0289; B29B 2017/0424; B29B 2017/0484; B29B 2017/0488; B29K 2029/14; B32B 27/12; B32B 27/30; Y02W 30/521; Y02W 30/622
See application file for complete search history.

(56) References Cited

U.S. PATENT DOCUMENTS

| | | | |
|---|---|---|---|
| 4,795,103 A * | 1/1989 | Lech | B02C 13/04 241/101.76 |
| 5,221,708 A | 6/1993 | Klaiber | |
| 5,505,390 A * | 4/1996 | Rodgers | B02C 13/06 241/152.2 |
| 5,984,216 A * | 11/1999 | Andela | B03B 9/062 241/186.4 |
| 7,521,107 B2 | 4/2009 | Bell | |
| 7,838,575 B2 | 11/2010 | Lang et al. | |
| 7,861,959 B2 * | 1/2011 | Eriksen | B02C 13/286 241/186.35 |
| 8,220,728 B2 * | 7/2012 | Eriksen | B02C 13/12 241/14 |
| 2009/0209667 A1 | 8/2009 | Thompson et al. | |
| 2010/0249253 A1 | 9/2010 | Fernandez et al. | |

FOREIGN PATENT DOCUMENTS

| | | | |
|---|---|---|---|
| DE | 19509244 C1 * | 11/1996 | |
| TW | I 222431 B * | 10/2004 | |
| TW | I 286953 B * | 9/2007 | |

* cited by examiner

*Primary Examiner* — Michael Tolin
(74) *Attorney, Agent, or Firm* — Fishman & Associates, LLC.

(57) ABSTRACT

Provided is a method of producing poly(vinyl butyral) laminate from discarded laminated glass. By means of breaking the discarded laminated glass, water-washing and grinding the reduced glass fragments, a reusable poly(vinyl butyral) material substantially free of glass pieces is obtained by physical treatment without using any organic solvent. After drying, granulation and formation steps, a poly(vinyl butyral) laminate is further obtained from the poly(vinyl butyral) material. Accordingly, the method not only reduces resource waste but also produces a water-proof poly(vinyl butyral) laminate, and is more environmentally friendly and more applicable to industry.

19 Claims, 3 Drawing Sheets

METHOD OF PRODUCING POLY(VINYL BUTYRAL) LAMINATE FROM DISCARDED LAMINATED GLASS

BACKGROUND OF THE INVENTION

1. Field of the Invention

The present invention related to a field of recovery and reuse of poly(vinyl butyral) material, and more particularly to a method of producing poly(vinyl butyral laminate from a discarded laminated glass.

2. Description of the Prior Arts

Poly(vinyl butyral) (PVB) is commonly used in the manufacture of polymer sheet that can be used as interlayers in light-transmitting laminates. Safety glass and windshield glass are composed of two glass plates and a poly(vinyl butyral) sheet interposed between the glass plates or alternatively composed of a single glass plate and a poly(vinyl butyral) sheet assembled therewith, and then the assembly is subjected in an autoclave to about 90° C. to 165° C. at pressure of about 1034 to 2067 kPa for at least 10 minutes to tightly bond the glass plate with poly(vinyl butyral) sheet, and then form the safety and windshield glass.

The poly(vinyl butyral) sheet can be produced by mixing poly(vinyl butyral) resin with one or more plasticizers, and optionally with one or more other ingredients, and melt processing the mixture into a sheet, which can be collected and rolled for storage and transportation. With adherence and impact strength of the poly(vinyl butyral) interlayer, safety and windshield glasses are crumbled into several small granular glass chunks instead of sharp shreds when broken.

Poly(vinyl butyral) is typically produced by a complicated synthesis, including separation of ethane from natural gas, dehydrogenation of ethane to produce ethylene, polymerization of vinyl acetate monomers to form poly(vinyl acetate), hydrolization of poly(vinyl acetate) to form poly(vinyl alcohol) and reaction between poly(vinyl alcohol) with butyraldehyde. Therefore, said chemical synthesis of poly(vinyl butyral) is expensive, environmentally unfriendly and not applicable for mass production. Thus, techniques of recycling the reusable poly(vinyl butyral) from laminated glass have been developing.

Some methods that recycle of poly(vinyl butyral) from a discard laminated glass and utilization of the recycled poly(vinyl butyral) are described in U.S. Pat. No. 7,521,107, which discloses a method of utilizing recovered poly(vinyl butyral) in the production of carpet backcoatings. However, the patent only mentions PVB can be separated and recovered from used or discarded safety glass via commercial windshield glass recycling methods, and does not teaches how to recycle the discarded safety glass in an environmentally friendly way.

U.S. Patent Appl. Pub. No. 2009/0209667 discloses a method of recycling poly(vinyl butyral) resin from safety glass. However, the method includes a solvent extraction of plasticizer and impurities and dissolution of poly(vinyl butyral) interlayer in organic solvents, such that a large amount of organic solvent waste and severe environmental contaminations are produced.

U.S. Patent Appl. Pub. No. 2010/0249253 also discloses a method of recycling of poly(vinyl butyral) from laminated glass. The laminated glass is shattered first to separate a poly(vinyl butyral) sheet from the laminated glass. The obtained poly(vinyl butyral) sheet is further cut into pieces, then proceeding to a surface cleaning process to eliminate the dirt and impurities. However, the method as disclosed requires a final chemical treatment for purification, and thereby resulting similar drawbacks as mentioned above.

There remains a need for recycling the reusable poly(vinyl butyral) material from the laminated glass in an environmentally friendly way to mitigate or obviate the aforementioned problems.

SUMMARY OF THE INVENTION

A first objective of the present invention is to provide an environmentally friendly method which produces a water-proof poly(vinyl butyral) laminate from a discarded laminated glass without using any organic solvents.

A second objective of the present invention is to reduce resource waste and recycle the poly(vinyl butyral) from the discarded laminated glass for producing a water-proof poly(vinyl butyral).

A third objective of the present invention is to obtain a reusable poly(vinyl butyral) material from the discarded laminated glass as raw material, such that complicated chemical synthesis of poly(vinyl butyral) material is not required to produce a water-proof poly(vinyl butyral) laminate.

To achieve the aforementioned objectives, the present invention provides a method of producing a poly(vinyl butyral) laminate from a discarded laminated glass, comprising the steps of:

providing a discarded laminated glass containing glass and poly(vinyl butyral);

breaking the discarded laminated glass into multiple reduced glass fragments, each reduced glass fragment comprising a poly(vinyl butyral) film and at least one glass piece attached onto the poly(vinyl butyral) film, and each poly(vinyl butyral) film of the reduced glass fragment having a total surface area less than 18 square centimeters ($cm^2$);

washing the reduced glass fragments with water and grinding the reduced glass fragments at a rotation speed ranging from 1400 revolutions per minute (rpm) to 2500 rpm for detaching the glass pieces from the poly(vinyl butyral) films of the reduced glass fragments, so as to obtain a poly(vinyl butyral) material substantially free of glass pieces;

drying the poly(vinyl butyral) material to obtain a dried poly(vinyl butyral) material, and granulating the dried poly(vinyl butyral) material to obtain poly(vinyl butyral) granules; and forming the poly(vinyl butyral) laminate from the poly(vinyl butyral) granules.

In accordance with the present invention, said discarded laminated glass may be obtained from, but not limited to, automobile safety glass, architectural safety glass or automobile windshield glass, which typically contain glass, poly(vinyl butyral), and undesired impurities. Based on a total amount of the discarded laminated glass, the discarded laminated glass preferably contains 3 percentage by weight (wt %) to 17 wt % of poly(vinyl butyral) and 83 wt % to 97 wt % of glass. The undesired impurities contain vinyl acetate, silicone resin, polyester resin, aluminum or any combinations thereof, and have a total amount equal to or less than 3 percentage by weight (wt %) based on a total amount of the discarded laminated glass.

Preferably, the step of breaking the discarded laminated glass into the reduced glass fragments comprises: crushing the discarded laminated glass to obtain a crushed glass; and then shredding the crushed glass to obtain the reduced glass fragments. The purpose of crushing the discarded laminated glass is to reduce the bonding strength between poly(vinyl butyral) film and glass to collect the majority of reduced glass pieces and undesired impurities from the discarded laminated glass. The crushed glass can be further shredded into lots of reduced crushed glass fragments; and after shredding process, each poly(vinyl butyral) film of the discarded glass fragment has a total surface area less than 18 cm$^2$, and preferably, ranging from 9 cm$^2$ to 18 cm$^2$. After crushing and shredding, the obtained reduced glass fragments have irregular shape.

Preferably, the step of crushing the discarded laminated glass to obtain crushed glass comprises: crushing the discarded laminated glass with a crush force less than 200 kgf by a roller crusher, a hydraulic crusher or their combinations, so as to obtain the crushed glass. More preferably, the crush force ranges from 100 kgf to 150 kgf.

Preferably, the step of shredding the crushed glass to obtain the reduced glass fragments comprises: shredding the crushed glass with a shredding force ranging from 3000 kgf to 12000 kgf to obtain the reduced glass fragments. More preferably, the shredding force ranges from 5000 kgf to 8000 kgf.

By means of crushing the discarded laminated glass before shredding, at least 50 wt % of glass contained in the discarded laminated glass is effectively removed. Accordingly, the production yield of the poly(vinyl butyral) material obtained from subsequent water-washing and grinding steps can be also improved. Preferably, 50 wt % to 80 wt % of glass contained in the discarded laminated glass is removed.

Preferably, the step of water-washing and grinding the reduced glass fragments by detaching glass pieces from the poly(vinyl butyral) films to obtain the poly(vinyl butyral) material substantially free of glass pieces comprises: kneading and washing the reduced glass fragments with water to obtain a first washed solution; filtering the first washed solution with a first filter assembly having pore sizes ranging from 0.25 cm to 4 cm to collect a first filtered solution comprising water, poly(vinyl butyral) and glass pieces having sizes less than the pore sizes of the first filter assembly; grinding the first filtered solution with a first grinder element having a surface roughness ranging from 2.0 micrometers to 3.0 micrometers, so as to obtain the poly(vinyl butyral) material substantially free of glass pieces from the first filtered solution. Said kneading and water-washing steps strip off the remaining glass pieces from the poly(vinyl butyral) films, and are considered as a further purification to remove glass and undesired impurities from the discarded glass. The first washed solution contains water, glass pieces derived from the reduced glass fragments, poly(vinyl butyral) derived from the reduced glass fragments and any other undesired impurities.

Preferably, the first filter assembly comprises a first filter element, a second filter element and a third filter element having different pore sizes.

Preferably, the step of filtering the first washed solution with the first filter assembly to collect the first filtered solution comprises: filtering the first washed solution with the first filter element of the first filter assembly having pore sizes ranging from 2.5 centimeters to 4.0 centimeters to collect a first solution comprising water, poly(vinyl butyral) and glass pieces having sizes less than the pore sizes of the first filter element of the first filter assembly; filtering the first solution with the second filter element of the first filter assembly having pore sizes ranging from 1.5 centimeters to 2.5 centimeters to collect a second solution comprising water, poly(vinyl butyral) and glass pieces having sizes less than the pore sizes of the second filter element of the first filter assembly; and filtering the second solution with the third filter element of the first filter assembly having pore sizes ranging from 0.25 centimeters to 1.5 centimeters, so as to collect the first filtered solution comprising water, poly(vinyl butyral) and glass pieces having sizes less than the pore sizes of the third filter element of the first filter assembly. More preferably, the step of filtering the second solution with the third filter element of the first filter assembly having pore sizes ranging from 0.25 cm to 1.5 cm comprises: filtering the second solution with the third filter element of the first filter assembly having pore sizes ranging from 0.25 cm to 1.2 cm.

After detaching the glass pieces from the poly(vinyl butyral) films through water-washing and grinding steps, the detached glass pieces having particle size larger than 4 cm are removed by the first filter assembly, and the detached glass pieces having particle size smaller than 4 cm are removed gradually when several filter elements having reduced pore size are used in sequence. As a result, the efficiency of removing glass from the discarded glass and the purity of the poly (vinyl butyral) material collected in the next step are improved.

Preferably, the step of grinding the first filtered solution with the first grinder element to obtain the poly(vinyl butyral) material substantially free of glass pieces comprises: grinding the first filtered solution with the first grinder element to obtain a first refined solution; kneading and washing the first refined solution with water to obtain a second washed solution; and filtering the second washed solution with a second filter assembly having pore sizes ranging from 0.2 centimeters to 1.5 centimeters, so as to obtain the poly(vinyl butyral) material substantially free of glass pieces from the second washed solution.

Preferably, the step of filtering the second washed solution with the second filter assembly to obtain the poly(vinyl butyral) material substantially free of glass pieces comprises: filtering the second washed solution with the second filter assembly to obtain a second filtered solution comprising water, poly(vinyl butyral) and glass pieces having sizes less than the pore sizes of the second filter assembly; and grinding the second filtered solution with a second grinder element having surface roughness ranging from 0.03 micrometers to 2.0 micrometers, so as to obtain the poly(vinyl butyral) material substantially free of glass pieces from the second filtered solution.

Preferably, the second filter assembly also comprises a first filter element, a second filter element and a third filter element having different pore sizes.

Preferably, the step of filtering the second washed solution with the second filter assembly to obtain the poly(vinyl butyral) material comprises: filtering the second washed solution with the first filter element of the second filter assembly having pore sizes ranging from 1.0 centimeters to 1.5 centimeters to collect a solution comprising water, poly(vinyl butyral) and glass pieces having sizes less than the pore sizes of the first filter element of the second filter assembly; filtering the first solution with the second filter element of the second filter assembly having pore sizes ranging from 0.5 centimeters to 1.0 centimeters to collect a second solution comprising water, poly(vinyl butyral) and glass pieces having sizes less than the pore sizes of the second filter element of the second filter assembly; and filtering the second solution with the third filter element of the second filter assembly having pore sizes ranging from 0.2 centimeters to 0.5 centimeters, so as to collect the second filtered solution comprising water, poly(vinyl butyral) and glass pieces having sizes less than the pore sizes of the third filter element of the second filter assembly.

More preferably, the steps of filtering the first solution with the second filter element of the second filter assembly having pore sizes ranging from 0.5 centimeters to 1.0 centimeters and filtering the second solution with the third filter element of the second filter assembly having pore sizes ranging from 0.2 centimeters to 0.5 centimeters comprise: filtering the first solution with the second filter element of the second filter assembly having pore sizes ranging from 0.5 centimeters to 0.9 centimeters and filtering the second solution with the third filter element of the second filter assembly having pore sizes ranging from 0.2 centimeters to 0.4 centimeters, so as to obtain the poly(vinyl butyral) material substantially free of glass pieces from the second washed solution.

After crushing, shredding, washing and grinding steps, two major components contained in the discarded laminated glass, i.e., glass and poly(vinyl butyral), are completely separated, such that the obtained poly (vinyl butyral) material is substantially free of glass pieces.

Preferably, the step of drying the poly(vinyl butyral) material comprises: drying the poly(vinyl butyral) material at a temperature ranging from 120° C. to 200° C. to obtain the dried poly(vinyl butyral) material for removing the water remaining in the poly(vinyl butyral) material.

Preferably, the step of granulating the dried poly(vinyl butyral) material to obtain poly(vinyl butyral) granules comprises: blending the dried poly(vinyl butyral) material with at least one additive to obtain a mixture; and kneading the mixture at a temperature ranging from 120° C. to 150° C. to obtain poly(vinyl butyral) granules. Said at least one additive comprises an UV absorber, an antioxidant, a deodorant, a filler, a flame retardant, an antiblocking agent, a colorant, a polymer modifier or any combinations.

Preferably, the step of forming the poly(vinyl butyral) laminate from the poly(vinyl butyral) granules comprises: calendering or casting the poly(vinyl butyral) granules to form the poly(vinyl butyral) laminate.

Preferably, the step of calendering or casting the poly(vinyl butyral) granules to form the poly(vinyl butyral) laminate comprises: heating the poly(vinyl butyral) granules to a temperature ranging from 100° C. to 200° C. to form a poly(vinyl butyral) molten; casting the poly(vinyl butyral) molten into a poly(vinyl butyral) layer; and laminating the poly(vinyl butyral) layer onto a fabric layer with a lamination speed ranging from 10 meters per minute to 30 meters per minute to obtain the poly(vinyl butyral) laminate, wherein the poly (vinyl butyral) laminate comprises the poly(vinyl butyral) layer and the fabric layer attached onto the poly(vinyl butyral) layer.

Preferably, the step of casting the poly(vinyl butyral) molten into a poly(vinyl butyral) layer comprises: extruding the poly(vinyl butyral) molten between two rollers at 5° C. to 15° C. for solidification directly, so as to cast the poly(vinyl butyral) molten into the poly(vinyl butyral) layer.

Preferably, the step of calendering or casting the poly(vinyl butyral) granules into the poly(vinyl butyral) laminate comprises: calendering the poly(vinyl butyral) granules into a poly(vinyl butyral) layer at a temperature ranging from 140° C. to 160° C. with a force ranging from 15 kgf to 30 kgf; and laminating the poly(vinyl butyral) layer with a fabric layer at a lamination speed ranging from 40 meters per minute to 100 meters per minute to obtain the poly(vinyl butyral) laminate, wherein the poly(vinyl butyral) laminate comprises the poly (vinyl butyral) layer and the fabric layer attached onto the poly(vinyl butyral) layer.

Preferably, the step of laminating the poly(vinyl butyral) layer onto the fabric layer comprises: laminating the poly (vinyl butyral) layer onto the fabric layer at a temperature ranging from 140° C. to 160° C. with a force ranging from 15 kgf to 30 kgf.

Said fabric layer may be made of natural fibers or synthetic fibers.

In one preferred embodiment, the poly(vinyl butyral) laminate is a single poly(vinyl butyral) layer. In a second preferred embodiment, the poly(vinyl butyral) laminate comprises a poly(vinyl butyral) layer and a fabric layer attached onto the poly(vinyl butyral) layer. In a third preferred embodiment, the poly(vinyl butyral) laminate comprises two fabric layers and a poly(vinyl butyral) layer formed between the fabric layers. In a fourth preferred embodiment, the poly(vinyl butyral) laminate comprises two poly(vinyl butyral) layers and a fabric layer formed between the fabric poly(vinyl butyral) layers.

Preferably, the step of laminating the poly(vinyl butyral) layer onto the fabric layer to obtain the poly(vinyl butyral) laminate comprises: coating an adhesive layer on the fabric layer to form an adhesive fabric layer; and laminating the poly(vinyl butyral) layer with the adhesive fabric layer to obtain the poly(vinyl butyral) laminate. The poly(vinyl butyral) laminate comprises the adhesive fabric layer and the poly(vinyl butyral) layer formed on the adhesive fabric layer. More specifically, the poly(vinyl butyral) laminate comprises the adhesive fabric layer and the poly(vinyl butyral) layer adhered onto the adhesive fabric layer. Said adhesive comprised in the adhesive fabric layer has an effect on improving the bonding strength between the poly(vinyl butyral) layer and the fabric layer.

Preferably, the adhesive coated on the fabric layer is made of a material comprising polyurethane (PU) and isocyanate. Said PU may be aqueous PU or solvent-based PU, and the isocyanate is soluble with said PU. More preferably, an amount of isocyanate ranges from 1 wt % to 20 wt % based on an amount of polyurethane.

The UV absorber applicable to the present invention comprises, but not limited to, benzophenone, benzotriazole, 2-(2H-benzotriazol-2-yl)-4,6-di-tert-pentylphenol, or any combinations thereof. Preferably, an amount of the UV absorber ranges from 0.1 wt % to 1.0 wt %, and more preferably from 0.3 wt % to 1.0 wt %, based on the total amount of the dried poly(vinyl butyral) material.

The antioxidant applicable to the present invention comprises, but not limited to, sterically hindered phenolic antioxidant, butylated hydroxytoluene (BHT), octadecyl 3,5-di-(tert)-butyl-4-hydroxyhydrocinnamate or any combinations thereof. Preferably, an amount of the antioxidant ranges from 0.1 wt % to 3.0 wt % based on the total amount of the dried poly(vinyl butyral) material.

The deodorant applicable to the present invention comprises, but not limited to, triethanolamine, diethanolamine, monoethanolamine, dimethylamine, diethylamine, triethylamine or any combinations thereof. Preferably, an amount of the deodorant ranges from 0.5 wt % to 3.0 wt % based on the total amount of the dried poly(vinyl butyral) material.

The filler applicable to the present invention comprises, but not limited to, glass fiber, carbon fiber, talc, $CaCO_3$, $BaSO_4$ or any combinations thereof. Preferably, an amount of the filler ranges from 0.01 wt % to 45 wt % based on the total amount of the dried poly(vinyl butyral) material.

The flame retardant applicable to the present invention comprises, but not limited to, sodium phosphate, magnesium hydroxide, aluminum hydroxide or any combinations thereof. Preferably, an amount of the flame retardant ranges from 0.01 wt % to 20 wt % based on the total amount of the dried poly(vinyl butyral) material.

The antiblocking agent applicable to the present invention comprises, but not limited to, fatty acid salt of alkali metal, fatty acid salt of alkaline-earth metal, fatty acid salt of transition metal, fatty acid amide or any combinations thereof. For example, the fatty acid salt of alkali metal may be potassium stearate, the fatty acid salt of alkaline-earth metal may be calcium stearate, the fatty acid salt of transition metal may be zinc stearate. Preferably, an amount of the antiblocking agent ranges from 0.3 wt % to 5 wt % based on the total amount of the dried poly(vinyl butyral) material.

The colorant applicable to the present invention comprises, but not limited to, dye, organic pigment, inorganic pigment or any combinations thereof. Preferably, an amount of the colorant ranges from 0.01 wt % to 15 wt % based on the total amount of the dried poly(vinyl butyral) material.

The polymer modifier applicable to the present invention comprises, but not limited to, polyolefin, thermoplastic resin or any combinations thereof. Preferably, an amount of the polymer modifier ranges from 5 wt % to 40 wt % based on the total amount of the dried poly(vinyl butyral) material.

In accordance with the present invention, the poly(vinyl butyral) laminate produced by the method of the present invention has a good water-proof property, and can be applied to rain coats, backpacks, shoes, clothes, toys and furniture.

Based on the aforementioned technical features, the method of producing a poly(vinyl butyral) laminate from a discarded laminated glass based on the recycle of the poly (vinyl butyral) material from the discarded laminated glass without chemical treatment. No organic solvent is used to recycle the poly(vinyl butyral) material from the discarded laminated glass, and thereby the method of the present invention is more environmentally friendly than the conventional methods.

Furthermore, the method of producing a poly(vinyl butyral) laminate from a discarded laminated glass not only reduces resource waste but also produces a water-proof poly (vinyl butyral) laminate with lower production cost.

Other objectives, advantages and novel features of the invention will become more apparent from the following detailed description when taken in conjunction with the accompanying drawings.

DETAILED DESCRIPTION OF THE PREFERRED EMBODIMENTS

Hereinafter, one skilled in the arts can easily realize the advantages and effects of the present invention from the following examples. Therefore, it should be understood that the descriptions proposed herein are just preferable examples only for the purpose of illustrations only, not intended to limit the scope of the invention. Various modifications and variations could be made in order to practice or apply the present invention without departing from the spirit and scope of the invention.

EXAMPLE 1

Figure 1:
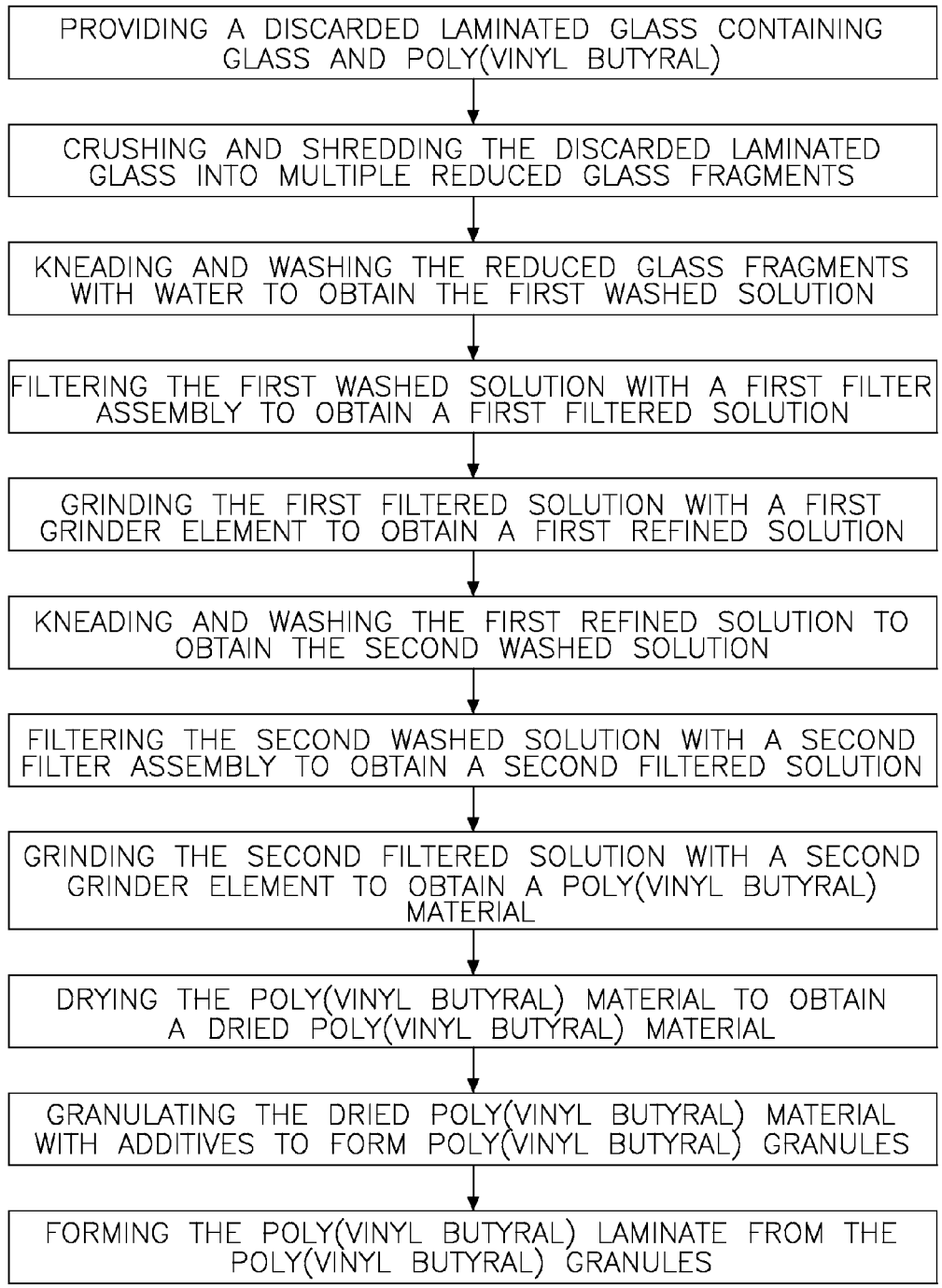
FIG. 1 a block diagram of a method of producing a poly (vinyl butyral) laminate from a discarded laminated glass in accordance with the present invention.

With reference to FIG. 1, a method of producing a poly (vinyl butyral) laminate from a discarded laminated glass was implemented as described below.

First, a discarded automobile safety glass comprising two glass plates and a poly(vinyl butyral) interlayer interposed between the glass plated was provided. The discarded automobile safety glass was used as a discarded laminated glass in the production of poly(vinyl butyral) laminate. Based on the total amount of the discarded laminated glass, the discarded laminated glass contained about 10 wt % of poly(vinyl butyral), about 87 wt % of glass, and about 3 wt % of dirt and other undesired materials such as silicon resin.

Next, the discarded automobile safety glass was roller-crushed with 200 kgf to obtain several crushed glasses, and then shredded with 7000 kgf by using a shredder to obtain multiple reduced glass fragments. After crushing and shredding steps, the original discarded automobile safety glass was broken into multiple reduced glass fragments and several glass chips. The reduced glass fragments comprised poly (vinyl butyral) films and at least one glass piece attached onto the poly(vinyl butyral) film, and each poly(vinyl butyral) film of the reduced glass fragment had a total surface area smaller than 18 $cm^2$. The glass chips were detached from the poly (vinyl butyral) interlayer of the discarded automobile safety glass. Based on the total weight of glass contained in the discarded automobile safety glass, the weight of glass contained in the glass chips was 65 wt %, and the weight of glass contained in the reduced glass fragments was only about 35%.

By means of crushing and shredding, the bonding strength between the poly(vinyl butyral) interlayer and the adjacent glass plates were largely reduced, such that a part of glass component was preliminarily removed and the sizes of the reduced glass fragments were also reduced for the subsequent steps.

Subsequently, the reduced glass fragments were kneaded and washed with water at room temperature to obtain the first washed solution, and then the first washed solution was filtered with a first filter element, a second filter element and a third filter element of the first filter assembly having pore sizes of 2.54 cm, 1.90 cm and 1.27 cm in sequence to obtain a first filtered solution. After the filtration step, the weight of glass contained in the first filtered solution remained only 15 wt % based on the total weight of glass contained in the discarded automobile safety glass.

Then the first filtered solution was grinded with a first grinder element having a surface roughness of 2.5 micrometers at 2000 rpm, so as to further decrease the bonding strength between the glass piece and the poly(vinyl butyral) film and then separate glass from poly(vinyl butyral) to obtain a first refined solution. The weight of glass contained in the first refined solution remained only 10 wt % based on the total weight of glass contained in the discarded automobile safety glass.

After that, the first refined solution was kneaded and washed with water again at room temperature to obtain the second washed solution, and then the second washed solution was filtered with a first filter element, a second filter element and a third filter element of the second filter assembly having pore sizes of 1 cm, 0.6 cm and 0.3 cm in sequence to obtain a second filtered solution. After the second filtration step, the weight of glass contained in the second filtered solution remained only 5 wt % based on the total weight of glass contained in the discarded automobile safety glass.

Then the second filtered solution was grinded with a second grinder element having a surface roughness of 1.0 micrometers at 2500 rpm, so as to decrease the bonding strength between the glass piece and the poly(vinyl butyral) film again and separate glass from poly(vinyl butyral) to obtain a poly(vinyl butyral) material, and then dried at 120° C. to obtain a dried poly(vinyl butyral) material.

Through the aforementioned two filtration steps and two grinding steps, the dried poly(vinyl butyral) material had a water content less than 2% and an amount of glass less than 2 wt % based on the total weight of glass contained in the discarded automobile safety glass.

Subsequently, 100 kg of the dried poly(vinyl butyral) material was mixed with 3 kg of calcium stearate, 0.5 kg of 2-(2H-benzotriazol-2-yl)-4,6-di-tert-pentylphenol (trade name: Tinuvin 328, manufactured by Ciba corporation), 0.5 kg of octadecyl 3,5-di-(tert)-butyl-4-hydroxyhydrocinnamate (trade name: Irganox 1010, manufactured by Ciba corporation), 2 kg of diethanolamine, 75 kg of $CaCO_3$, 3 kg of aluminum hydroxide, 3 kg of carbon black with kneader, and then extruded the dried mixtures to obtain poly(vinyl butyral) granules having a particle size of 4 mm.

Next, the poly(vinyl butyral) granules were heated to 160° C. to form a poly(vinyl butyral) molten, and then extruded between two rubber rollers with temperature at 10° C. for solidification directly, so as to cast the poly(vinyl butyral) molten into fabric to form the poly(vinyl butyral) laminate.

Accordingly, the method of the instant example was carried out by only physical treatment and without using any organic solvent to separate poly(vinyl butyral) from the discarded laminated glass, and thereby a water-proof poly(vinyl butyral) laminate was directly obtained by casting.

Figure 2:
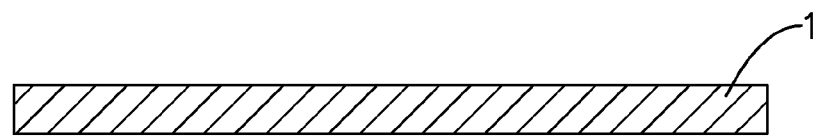
FIG. 2 is a side view of a poly(vinyl butyral) laminate of Example 1.

With reference to FIG. 2, the poly(vinyl butyral) laminate is a poly(vinyl butyral) layer 1. No pinhole was observed on the poly(vinyl butyral) laminate with eyes. It showed that the glass from the discarded laminated glass was completely separated by the method, and the obtained poly(vinyl butyral) material is substantially free of glass and is suitable for reuse to produce the poly(vinyl butyral) laminate.

EXAMPLE 2

In the instant example, a similar process was performed as Example 1 to obtain the poly(vinyl butyral) granules. The difference between Examples 1 and 2 was that the poly(vinyl butyral) kneaded mixtures were calendered by using four rollers at 140° C., also with a force of 25 kgf and a speed of 60 meters per minute to form a poly(vinyl butyral) layer. Then a fabric layer was coated by adhesive, collected and rolled on a roller, and the poly(vinyl butyral) layer was collected and rolled on another roller. After that, the adhesive coated fabric layer was laminated by poly(vinyl butyral) layer with a force of 15 kgf, at a lamination speed of 60 meters per minute at 140° C., so as to form a poly(vinyl butyral) laminate.

Figure 3:
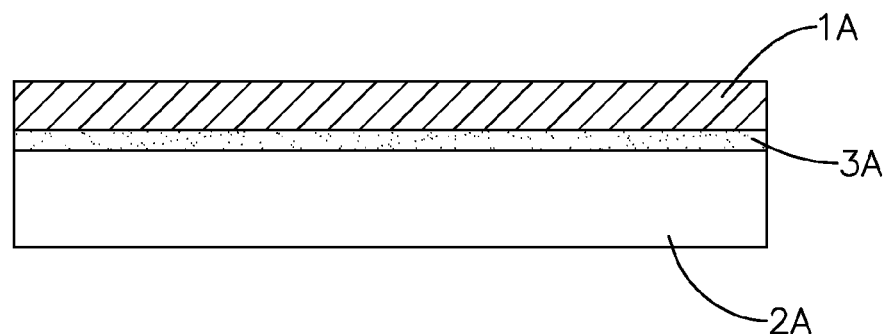
FIG. 3 is a side view of a poly(vinyl butyral) laminate of Example 2.

With reference to FIG. 3, the poly(vinyl butyral) laminate comprises a poly(vinyl butyral) layer 1A, a fabric layer 2A and an adhesive layer 3A, wherein the adhesive layer 3A is formed between the poly(vinyl butyral) layer 1A and the fabric layer 2A.

EXAMPLE 3

In the instant example, a similar process was performed as Example 2 to obtain the poly(vinyl butyral) material, and following similar drying, mixing and calendering steps to obtain a poly(vinyl butyral) layer attached with the fabric layer. The differences between Examples 2 and 3 were that the poly(vinyl butyral) laminate obtained from Example 2 was rolled on a roller, and the poly(vinyl butyral) layer obtained from Example 1 was collected and rolled on another roller. After that, the poly(vinyl butyral) laminate obtained from Example 2 and the poly(vinyl butyral) layer obtained from Example 1 were laminated together with a force of 25 kgf, at a lamination speed of 30 meters per minute at 140° C., so as to form a poly(vinyl butyral) laminate of the instant example.

Figure 4:
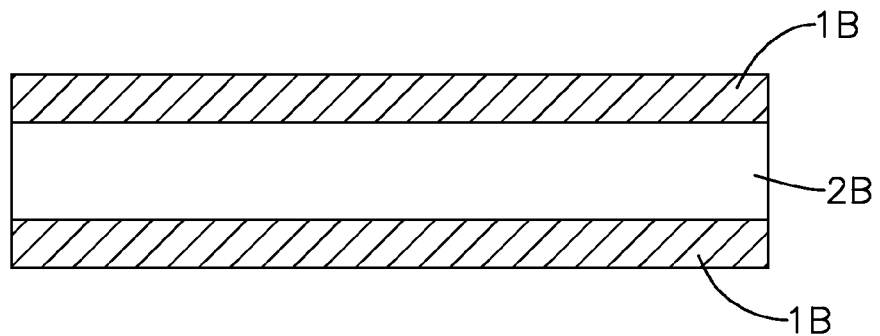
FIG. 4 is a side view of a poly(vinyl butyral) laminate of Example 3.

With reference to FIG. 4, the poly(vinyl butyral) laminate comprises two poly(vinyl butyral) layers 1B and a fabric layer 2B, wherein the fabric layer 2B is formed between the poly (vinyl butyral) layers 1B.

EXAMPLE 4

In the instant example, a similar process was performed as Example 1 to obtain the poly(vinyl butyral) material, and following similar drying, mixing and calendering steps to obtain a poly(vinyl butyral) layer. The differences between Examples 1 and 4 were that two fabric layers were respectively laminated onto two opposite surfaces of the poly(vinyl butyral) layer obtained from Example 1 with a force of 25 kgf, at a lamination speed of 30 meters per minute at 140° C., so as to form a poly(vinyl butyral) laminate of the instant example.

Figure 5:
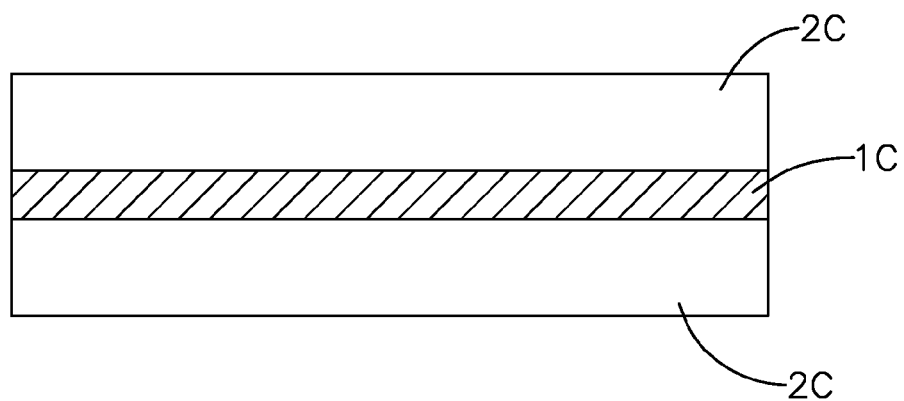
FIG. 5 is a side view of a poly(vinyl butyral) laminate of Example 4.

With reference to FIG. 5, the poly(vinyl butyral) laminate comprises a poly(vinyl butyral) layer 1C and two fabric layers 2C, the poly(vinyl butyral) layer is formed between the fabric layers 2C.

EXAMPLE 5

Another method of producing a poly(vinyl butyral) laminate from a discarded laminated glass was implemented as described below.

First, a dried poly(vinyl butyral) materials were dissolved in a mixture solvents to form a mixture solution. Then the mixture solution was coated onto the fabric layers through gravure or knife coating process, and following by drying to produce a poly(vinyl butyral) laminate. The poly(vinyl butyral) laminate has a thickness ranging from 0.001 mm to 0.01 mm.

In comparison with the conventional method, the method of producing a poly(vinyl butyral) laminate was obtained by the recycle of the reusable poly(vinyl butyral) granules after suitable physical treatment, and then proceeding to a formation step to obtain a poly(vinyl butyral) laminate. Furthermore, lamination between a poly(vinyl butyral) layer and a fabric layer also can be modified depending on various use to provide various embodiments of the poly(vinyl butyral) laminate. Accordingly, the method not only reduces resource waste but also produces a water-proof poly(vinyl butyral) laminate with lower production cost and less environmental pollution, and thereby is more applicable to industry than the method in the prior art.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of producing poly(vinyl butyral) laminate from a discarded laminated glass, comprising the steps of:
    providing a discarded laminated glass containing glass and poly(vinyl butyral);
    breaking the discarded laminated glass into multiple reduced glass fragments, each reduced glass fragment comprising a poly(vinyl butyral) film and at least one glass piece attached onto the poly(vinyl butyral) film, and each poly(vinyl butyral) film of the reduced glass fragment having a total surface area less than 18 square centimeters;

washing the reduced glass fragments with water and grinding the reduced glass fragments at a rotation speed ranging from 1400 revolutions per minute (rpm) to 2500 rpm, so as to obtain a poly(vinyl butyral) material substantially free of glass pieces;

drying the poly(vinyl butyral) material to obtain a dried poly(vinyl butyral) material and granulating the dried poly(vinyl butyral) material to obtain poly(vinyl butyral) granules; and forming the poly(vinyl butyral) laminate from the poly (vinyl butyral) granules.

2. The method as claimed in claim 1, wherein the step of breaking the discarded laminated glass into the reduced glass fragments comprises:

crushing the discarded laminated glass to obtain a crushed glass; and shredding the crushed glass to obtain the reduced glass fragments.

3. The method as claimed in claim 2, wherein the step of crushing the discarded laminated glass to obtain crushed glass comprises:

crushing the discarded laminated glass with a crush force less than 200 kilogram-force (kgf) by a roller crusher, a hydraulic crusher or their combinations, so as to obtain the crushed glass.

4. The method as claimed in claim 2, wherein the step of shredding the crushed glass to obtain the reduced glass fragments comprises:

shredding the crushed glass with a shredding force ranging from 3000 kgf to 12000 kgf to obtain the reduced glass fragments.

5. The method as claimed in claim 3, wherein the step of shredding the crushed glass to obtain the reduced glass fragments comprises:

shredding the crushed glass with a shredding force ranging from 5000 kgf to 8000 kgf to obtain the reduced glass fragments.

6. The method as claimed in claim 1, wherein the step of drying the poly(vinyl butyral) material comprises:

drying the poly(vinyl butyral) material at a temperature ranging from 120° C. to 200° C. to obtain the dried poly(vinyl butyral) material.

7. The method as claimed in claim 1, wherein the step of washing the reduced glass fragments with water and grinding the reduced glass fragments to obtain the poly(vinyl butyral) material substantially free of glass pieces comprises:

kneading and washing the reduced glass fragments with water to obtain a first washed solution comprising water, glass pieces and poly(vinyl butyral);

filtering the first washed solution with a first filter assembly having pore sizes ranging from 0.25 centimeters to 4 centimeters, so as to collect a first filtered solution comprising water, poly(vinyl butyral) and glass pieces having sizes less than the pore sizes of the first filter assembly; and grinding the first filtered solution with a first grinder element having a surface roughness ranging from 2.0 micrometers to 3.0 micrometers, so as to obtain the poly(vinyl butyral) material substantially free of glass pieces from the first filtered solution.

8. The method as claimed in claim 7, wherein the step of grinding the first filtered solution with the first grinder element to obtain the poly(vinyl butyral) material substantially free of glass pieces comprises:

grinding the first filtered solution with the first grinder element to obtain a first refined solution;

kneading and washing the first refined solution with water to obtain a second washed solution; and filtering the second washed solution with a second filter assembly having pore sizes ranging from 0.2 centimeters to 1.5 centimeters, so as to obtain the poly(vinyl butyral) material substantially free of glass pieces from the second washed solution.

9. The method as claimed in claim 8, wherein the step of filtering the second washed solution with the second filter assembly to obtain the poly(vinyl butyral) material substantially free of glass pieces comprises:

filtering the second washed solution with the second filter assembly to obtain a second filtered solution comprising water, poly(vinyl butyral) and glass pieces having sizes less than the pore sizes of the second filter assembly; and grinding the second filtered solution with a second grinder element having a surface roughness ranging from 0.03 micrometers to 2.0 micrometers, so as to obtain the poly(vinyl butyral) material substantially free of glass pieces from the second filtered solution.

10. The method as claimed in claim 9, wherein the first filter assembly comprises a first filter element, a second filter element and a third filter element, and the step of filtering the first washed solution with the first filter assembly to collect the first filtered solution comprises:

filtering the first washed solution with the first filter element of the first filter assembly having pore sizes ranging from 2.5 centimeters to 4.0 centimeters to collect a first solution comprising water, poly(vinyl butyral) and glass pieces having sizes less than the pore sizes of the first filter element of the first filter assembly;

filtering the first solution with the second filter element of the first filter assembly having pore sizes ranging from 1.5 centimeters to 2.5 centimeters to collect a second solution comprising water, poly(vinyl butyral) and glass pieces having sizes less than the pore sizes of the second filter element of the first filter assembly; and filtering the second solution with the third filter element of the first filter assembly having pore sizes ranging from 0.25 centimeters to 1.5 centimeters, so as to collect the first filtered solution.

11. The method as claimed in claim 10, wherein the second filter assembly comprises a first filter element, a second filter element and a third filter element, and the step of filtering the second washed solution with the second filter assembly to obtain the second filtered solution comprises:

filtering the second washed solution with the first filter element of the second filter assembly having pore sizes ranging from 1.0 centimeters to 1.5 centimeters to collect a first solution comprising water, poly(vinyl butyral) and glass pieces having sizes less than the pore sizes of the first filter element of the second filter assembly;

filtering the first solution with the second filter element of the second filter assembly having pore sizes ranging from 0.5 centimeters to 1.0 centimeters to collect a second solution comprising water, poly(vinyl butyral) and glass pieces having sizes less than the pore sizes of the second filter element of the second filter assembly; and filtering the second solution with the third filter element of the second filter assembly having pore sizes ranging from 0.2 centimeters to 0.5 centimeters, so as to collect the second filtered solution.

12. The method as claimed in claim 1, wherein the step of granulating the dried poly(vinyl butyral) material to obtain poly(vinyl butyral) granules comprises:
- blending the dried poly(vinyl butyral) material with at least one additive to obtain a mixture; and
- kneading the mixture at a temperature ranging from 120° C. to 150° C. to obtain poly(vinyl butyral) granules,
- wherein the at least one additive comprises an UV absorber, an antioxidant, a deodorant, a filler, a flame retardant, an antiblocking agent, a colorant, a polymer modifier or any combinations thereof.

13. The method as claimed in claim 1, wherein the step of forming the poly(vinyl butyral) laminate from the poly(vinyl butyral) granules comprises:
- calendering or casting the poly(vinyl butyral) granules to form the poly(vinyl butyral) laminate.

14. The method as claimed in claim 13, wherein the step of calendering or casting the poly(vinyl butyral) granules to form the poly(vinyl butyral) laminate comprises:
- heating the poly(vinyl butyral) granules to a temperature ranging from 100° C. to 200° C. to form a poly(vinyl butyral) molten;
- casting the poly(vinyl butyral) molten into a poly(vinyl butyral) layer; and
- laminating the poly(vinyl butyral) layer onto a fabric layer at a lamination speed ranging from 10 meters per minute to 30 meters per minute to obtain the poly(vinyl butyral) laminate, wherein the poly(vinyl butyral) laminate comprises the poly(vinyl butyral) layer and the fabric layer attached onto the poly(vinyl butyral) layer.

15. The method as claimed in claim 14, wherein the step of laminating the poly(vinyl butyral) layer onto the fabric layer to obtain the poly(vinyl butyral) laminate comprises:
- coating an adhesive on the fabric layer to form an adhesive fabric layer;
- laminating the poly(vinyl butyral) layer with the adhesive fabric layer to obtain the poly(vinyl butyral) laminate, wherein the poly(vinyl butyral) laminate comprises the adhesive fabric layer and the poly(vinyl butyral) layer formed on the adhesive fabric layer.

16. The method as claimed in claim 15, wherein the adhesive comprises polyurethane and isocyanate, and an amount of isocyanate ranges from 1 wt % to 20 wt % based on an amount of polyurethane.

17. The method as claimed in claim 13, wherein the step of calendering or casting the poly(vinyl butyral) granules to form the poly(vinyl butyral) laminate comprises:
- calendering the poly(vinyl butyral) granules into a poly(vinyl butyral) layer at a temperature ranging from 140° C. to 160° C. with a force ranging from 15 kgf to 30 kgf; and
- laminating the poly(vinyl butyral) layer with a fabric layer at a lamination speed ranging from 40 meters per minute to 100 meters per minute to obtain the poly(vinyl butyral) laminate, wherein the poly(vinyl butyral) laminate comprises the poly(vinyl butyral) layer and the fabric layer attached onto the poly(vinyl butyral) layer.

18. The method as claimed in claim 17, wherein the step of laminating the poly(vinyl butyral) layer onto the fabric layer to obtain the poly(vinyl butyral) laminate comprises:
- coating an adhesive on the fabric layer to form an adhesive fabric layer; and
- laminating the poly(vinyl butyral) layer with the adhesive fabric layer to obtain the poly(vinyl butyral), wherein the poly(vinyl butyral) laminate comprises the adhesive fabric layer and the poly(vinyl butyral) layer formed on the adhesive fabric layer.

19. The method as claimed in claim 18, wherein the adhesive comprises polyurethane and isocyanate, and an amount of isocyanate ranges from 1 wt % to 20 wt % based on an amount of polyurethane.

* * * * *